June 3, 1969
J. J. MANNO
3,447,966
APPARATUS FOR FLUSHING DEBRIS FROM
THE REGION OF A VEHICLE BRAKE
Filed July 14, 1966
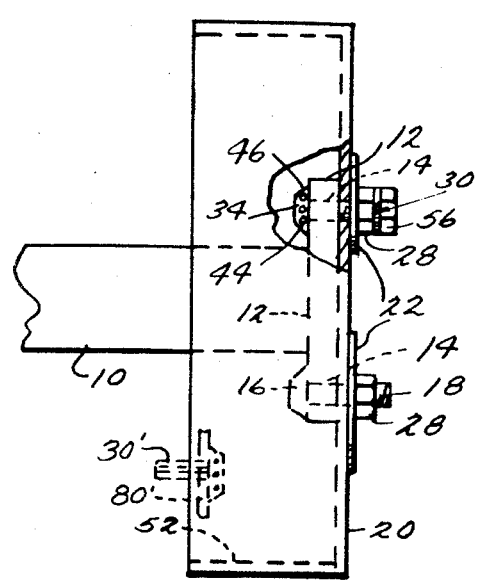
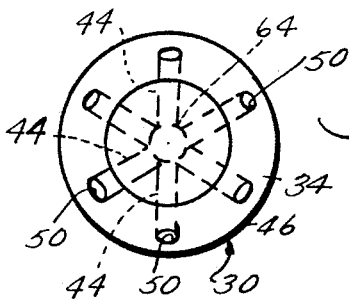
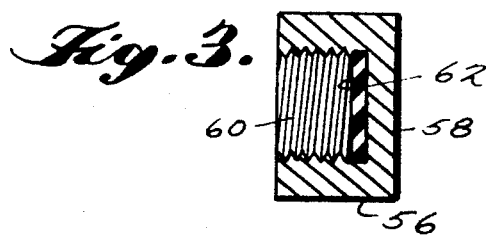
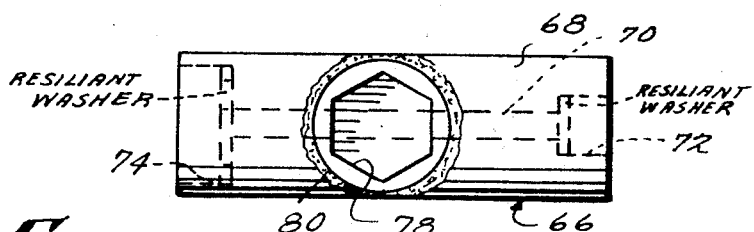
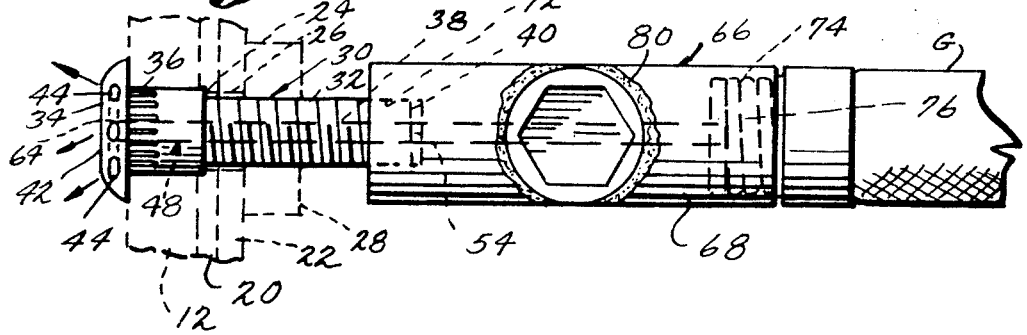
INVENTOR.
JAMES J MANNO
BY
Cushman, Darby & Cushman
ATTORNEYS United States Patent Office 3,447,966
Patented June 3, 1969

3,447,966
APPARATUS FOR FLUSHING DEBRIS FROM THE REGION OF A VEHICLE BRAKE
James J. Manno, 600 Oak St., Ridgway, Pa. 15853
Filed July 14, 1966, Ser. No. 565,274
Int. Cl. B08b 3/02
U.S. Cl. 134—22       8 Claims The present invention relates to vehicle brake maintenance and more particularly to means for flushing debris from vehicle brake assemblies.

Vehicles, such as on- and/or off-the-road four wheel drive utility trucks, tractors, and the like are often driven through mud, muck or loose soil that is so deep that the material being driven through splashes or oozes into the area adjacent the wheels in wihch brake drums, brake linings and securement and adjustment means for the brake linings are located. Thereafter, when the vehicle is driven this debris causes more rapid wear of the brake linings and may score the drums or cause the formation of an uneven deposition of a silicious coating on the drums such as results in a deterioration of braking efficiency. In addition, when an adjustment is to be made to the brake linings securement devices in order to reduce the amount of brake pedal depression needed to apply the brakes, the debris which has become caked upon the brake assemblies hinders access to the adjustment sites.

Although the problems just discussed are particularly significant where off-the-road vehicles are concerned, it should be apparent that automobiles, trucks, buses and the like, driven on the highways are also subject to the accumulation of wear producing dust and mud in the brake assemblies.

Accordingly, it is a primary object of the present invention to provide easily wearable means for flushing debris from vehicle brake assemblies.

A further object of the invention is the provision of apparatus of the type described which allows a conventional garden hose to be used to flush debris from brake assemblies, the apparatus including a novel adaptor device.

Another object of the present invention is the provision of a method for easily cleaning debris from vehicle brake assemblies.

These and further objects of the present invention as well as the principles and scope of advantageous employment thereof will become more evident during the course of the following discussion during which reference is made from time to time to the illustrative embodiment shown in the attached drawings.

In the drawing:

FIGURE 1 is a somewhat diagrammatic fragmentary side elevation view with some parts broken away and sectioned of a vehicle wheel brake assembly having a stud according to the present invention substituted for one of the conventional lug nut studs, some conventional elements of the assembly not necessary for imparting a clear understanding of the present invention having been omitted;

FIGURE 2 is a left end elevation view of the stud of FIGURE 1;

FIGURE 3 is a longitudinal cross-sectional view of a removable stud cover for the stud of FIGURES 1 and 2;

FIGURE 4 is a side elevation view of an adaptor for removing the cover of FIGURE 3 and for connecting a common garden hose or the like to the novel stud; and FIGURE 5 is a side elevation view of the adaptor of FIGURE 4 coupling a garden hose to the novel stud and this assembly being used to flush debris from within the brake drum region.

Referring now to FIGURE 1, a conventional vehicle axle is depicted at 10 having a flange 12 rotatably secured at one end thereof. The conventional flange 12 has a plurality of arcuate holes 14 formed axially therethrough into which a plurality of studs 16 are usually pressed so as to have their threaded shank ends 18 directed outwardly. Usually brake drums 20 and the wheel 22 are provided with similarly placed openings 24, 26 by which these elements are mounted respecting the axle via the studs 16. Lug nuts 28 threadably removably mounted on the studs 16 retain the wheel 22 in a mounted condition.

In the present instance, one or more conventional studs 16 have each been replaced by a stud 30. As can be seen from FIGURES 1, 2 and 5, the stud 30 comprises an exteriorly threaded shank 32 and an enlarged head 34. In instances where the stud 30 is to be pressed into place, the shank 32 near the head 34 is provided with flutes 36 to ease assembly and retention and prevent rotation of the stud 30 respecting its mounting. The stud 30 is shown including a central, longitudinal bore 38 which begins at the shank free end 40 and progresses well into the head 34, but terminating short of the head 34 outer end 42. A plurality of radially directed openings 44 formed in the head 34 from the radially outer periphery 46 thereof intersect, and communicate with, the bore 38 defining a passageway 48.

Accordingly, when the stud 30 is pressed in place as shown in FIGURES 1 and 5, the passageway 48 communicates at one exit end 50 with the region of the brake drum interior 52 where the brake shoes, linings, adjustors and the like (not shown) are located, and communicates at the opposite entrance end 54 with the exterior of the wheel 22.

In order to prevent clogging of the entrance end 50 of the passageway 48, a removable cover 56 is provided, being in the form of a peripherally noncircular nut having a web 58 blinding one end of the bore 60 thereof, the latter being internally threaded complementarily to the stud 30 to allow the cover 56 to be received thereon.

A disk-shaped gasket 62 is received in the cover bore 60 adjacent the web 58 so that when the cover 56 is threaded tight on the free end of the stud 30 shank, liquid as well as particulate foreign matter is prevented from entering the passageway 48 entrance.

After the vehicle on which the assembly of FIGURE 1 is mounted happens to be driven through mud, muck or dust so that some debris therefrom has gotten into the brake drum area, the cover 56 can be threadably removed and a stream of flushing water under pressure forced into the passageway 48 through the entrance end 54, divided at 64 and sprayed out the openings 50, cleansing the debris from the brake drum, shoes, linings, adjustors and the like.

In order to facilitate removal and replacement of the cover 56 and to facilitate connection of a convenient supply of water under pressure (e.g., a common garden hose G, or the like) to stud 30, an adaptor 66 (FIGURES 4 and 5) is provided according to the present invention.

The adaptor 66 is shown comprising a generally tubular member 68 having a central longitudinal throughbore 70 having an internally threaded socket 72 at one end complementary to the stud 30 threaded free end, and an internally threaded socket 74 at the opposite end complementary to conventional garden hose externally threaded end fittings such as the fitting 76.

Intermediate the ends thereof the member 68 is shown having a radially outwardly opening noncircular socket 78 thereon, shown peripherally welded in place at 80 in the drawing, although it would be within the purview of the present invention to make the socket 78 integral with the member 68. The socket 78 is complementary to the noncircular external periphery of the cover 56.

Accordingly, when debris is to be flushed from the brake drum area of the FIGURE 1 equipment, the adaptor 66, socket 78 is first fitted over the cover 56 and rotated, for instance manually in view of the convenient, leverage-permitting T-shape of the adaptor 66, the cover 56 being thereby removed.

Next the adaptor socket 72 is threaded onto the stud 30 and a garden hose G or the like threaded into the adaptor socket 74. The water is then turned on and moves through the hose, adaptor and stud passageway and sprays out the openings 50, flushing debris from the brake drum area. When flushing is completed, the hose, adaptor socket 74 a stud outer end can be communicated to a pressurized air source such as a compressor, in order to free the area of excess water if necessary and to possibly effect removal of more debris therewith.

To return the vehicle to a ready-for-use condition, the hose is disassembled from the adaptor and the adaptor from the stud 30. The adaptor socket 78 is then used to fasten the cover 56 back on the stud 30 outer end.

It should be apparent that the device just described is advantageously useful on all the ground engaging wheels of a vehicle. It should also be apparent that whereas the stud 30 comprises a wheel mounting stud, one or more further or substitutionary studs 30 not positioned for wheel mounting can be mounted on the vehicle upon or near the brake assemblies thereof, with the provisos that the nozzle ends thereof be in communication with the area to be cleaned and that the inlet end of the stud passageway be easily accessible for mounting and demounting of the cover and adaptor. For instance, an additional stud 30' dashed lines, (FIGURE 1) can be positioned on the backing plate 80' to which the brake lining, brake cylinders and the like (not shown) are conventionally secured. The stud 30' is materially identical to the stud 30 and is used in the same manner employing a removable cap, adaptor 66 and water hose to flush debris from the brake drum area.

As should now be apparent, the embodiment shown in the drawing clearly illustrates the principles of the invention and provides for accomplishment of each of the objects set forth at the beginning of this specification. Because the specific embodiment shown can be considerably modified, yet continue to achieve the objects of the invention without departing from the principles thereof, the present invention should be understood as encompassing all such modifications as lie within the spirit and scope of the following claims.

I claim:
1. Apparatus for flushing debris from the region of a vehicle brake drum comprising: nozzle means mountable on the vehicle in the region of the brake drum, said nozzle means including a shank and an enlarged head on one end of said shank; means defining a longitudinal passageway in said shank opening through the opposite end thereof from such one end; said one end being positionable for communication with the interior of the brake drum; means defining a plurality of angularly spaced radially directed openings in said head communicating at the radially inner ends thereof with said longitudinal passageway whereby fluid forced into said passageway through said opposite end issues from said radially directed openings to flush debris from said brake drum region.

2. The apparatus of claim 1 wherein said nozzle means comprises a lug nut stud.

3. The apparatus of claim 2 wherein said shank has flute means on the exterior thereof adjacent said head for facilitating press fitting said lug nut stud onto a brake drum with the shank opposite end directed outwardly of the vehicle.

4. The apparatus of claim 1 further comprising exterior threading on said shank near said opposite end whereby a protective cover and a pressurized fluid source are alternately coupleable to said shank.

5. The apparatus of claim 4 further comprising a cover threadably, removably receivable on said shank opposite end, said cover having means defining an internally threaded socket therein threaded complementarily to said shank and having a noncircular peripheral surface thereon constructed and arranged to receive means for threading said cover onto, and threadably removing said cover from said shank.

6. The apparatus of claim 5 further including non-cover in peripheral engagement therewith for threading said cover onto and threadably removing said cover from said shank, said socket means being mounted on the exterior of a tube having a longitudinal bore, said socket means opening laterally outwardly of said tube from about midway between the ends of said tube; means defining internal threading on said tube in the bore thereof near one end of the tube, the threading being complementary to the external threads on said shank, whereby said tube is removably threadable onto said shank; and means on the opposite end of said tube for securing said tube to a source of water under pressure.

7. A method for flushing debris from the region of a vehicle wheel brake drum comprising: mounting a nozzle on the brake drum so as to have an outlet end communicating with the interior of the brake drum and an inlet end positioned for easy access externally of the respective vehicle wheel; securing an adaptor to the nozzle inlet end; securing the adaptor to a water hose; directing water under pressure through the water hose, adaptor and nozzle out said outlet end and onto said brake drum.

8. The method of claim 7 comprising: terminating flow of water through said water hose and initiating flow of pressurized air through said nozzle to drive excess water from the brake drum.

References Cited

UNITED STATES PATENTS

| | | | |
|---|---|---|---|
| 1,509,327 | 9/1924 | Winchester | 134—22 |
| 1,511,951 | 10/1924 | Diller | 188—1 XR |
| 1,584,505 | 5/1926 | Bevins | 134—36 XR |
| 1,825,013 | 9/1931 | Patton | 134—22 XR |
| 1,949,553 | 3/1934 | Tremolada | 188—218 XR |
| 2,837,178 | 6/1958 | Burnett | 188—218 XR |
| 2,903,099 | 9/1959 | Nelson | 188—218 XR |
| 2,982,378 | 5/1961 | Scott | 188—218 XR |
| 3,133,306 | 5/1964 | Pitts | 134—123 XR |

MORRIS O. WOLK, *Primary Examiner.*

J. ZATARGA, *Assistant Examiner.*

U.S. Cl. X.R.

134—26, 34, 37, 123, 198; 188—1, 218